United States Patent
Kalisz

(10) Patent No.: US 6,315,152 B1
(45) Date of Patent: Nov. 13, 2001

(54) TUBE STORAGE DEVICE

(75) Inventor: Jim Kalisz, Burbank, CA (US)

(73) Assignee: Bardwell & MCalister, Inc., Pacoima, CA (US)

( * ) Notice: Subject to any disclaimer, the term of this patent is extended or adjusted under 35 U.S.C. 154(b) by 0 days.

(21) Appl. No.: 09/130,951

(22) Filed: Aug. 7, 1998

(51) Int. Cl.⁷ ........................................................ F16L 3/00
(52) U.S. Cl. .......................... 220/735; 215/390; 222/538; 248/213.2
(58) Field of Search ................................... 220/735, 710, 220/736, 744; 222/538; 24/339, 483–485; 215/386, 390, 391, 399; 248/312, 316.7, 213.2

(56) References Cited

U.S. PATENT DOCUMENTS

| | | | |
|---|---|---|---|
| 3,486,630 | * 12/1969 | Ellman | 211/13.1 |
| 3,542,209 | * 11/1970 | Thompson | 248/213.2 |
| 4,305,528 | 12/1981 | Craig . | |
| 4,819,838 | 4/1989 | Hart, Jr. . | |
| 4,823,445 | 4/1989 | Diener . | |
| 4,903,848 | * 2/1990 | Chattman | 215/227 |
| 5,143,263 | 9/1992 | Newell . | |
| 5,178,354 | 1/1993 | Engvall . | |
| 5,460,264 | * 10/1995 | Rupert | 206/217 |
| 5,482,095 | * 1/1996 | De Chollet | 141/380 |
| 5,542,209 | * 8/1996 | Sheu | 47/44 |
| 5,544,783 | 8/1996 | Conigliaro . | |
| 5,558,247 | 9/1996 | Caso . | |
| 5,772,068 | 6/1998 | Hailey . | |
| 5,772,084 | 6/1998 | Yale et al. . | |
| 5,988,575 | * 11/1999 | Lesko | 248/213.2 |

* cited by examiner

Primary Examiner—Gene Mancene
Assistant Examiner—Joseph C. Merek
(74) Attorney, Agent, or Firm—Blakely Sokoloff Taylor & Zafman

(57) ABSTRACT

The invention relates to a device for storing an extension tube with a spray can. With the can having an exterior surface and the exterior surface of the can having a cross-section, an embodiment of the invention comprises a sleeve having a cavity adapted to receive the tube. The sleeve is coupled to the can through two resilient wings on the sleeve where the interior surface formed by these wings has a cross-section that conforms to, and is smaller than the cross-section of the exterior surface of the spray can. Through a slot formed by the free ends of the wings, the can engages the interior surface of the wings by causing the slot to deform apart then return towards the original width of the slot as the can passes between the slot.

4 Claims, 3 Drawing Sheets

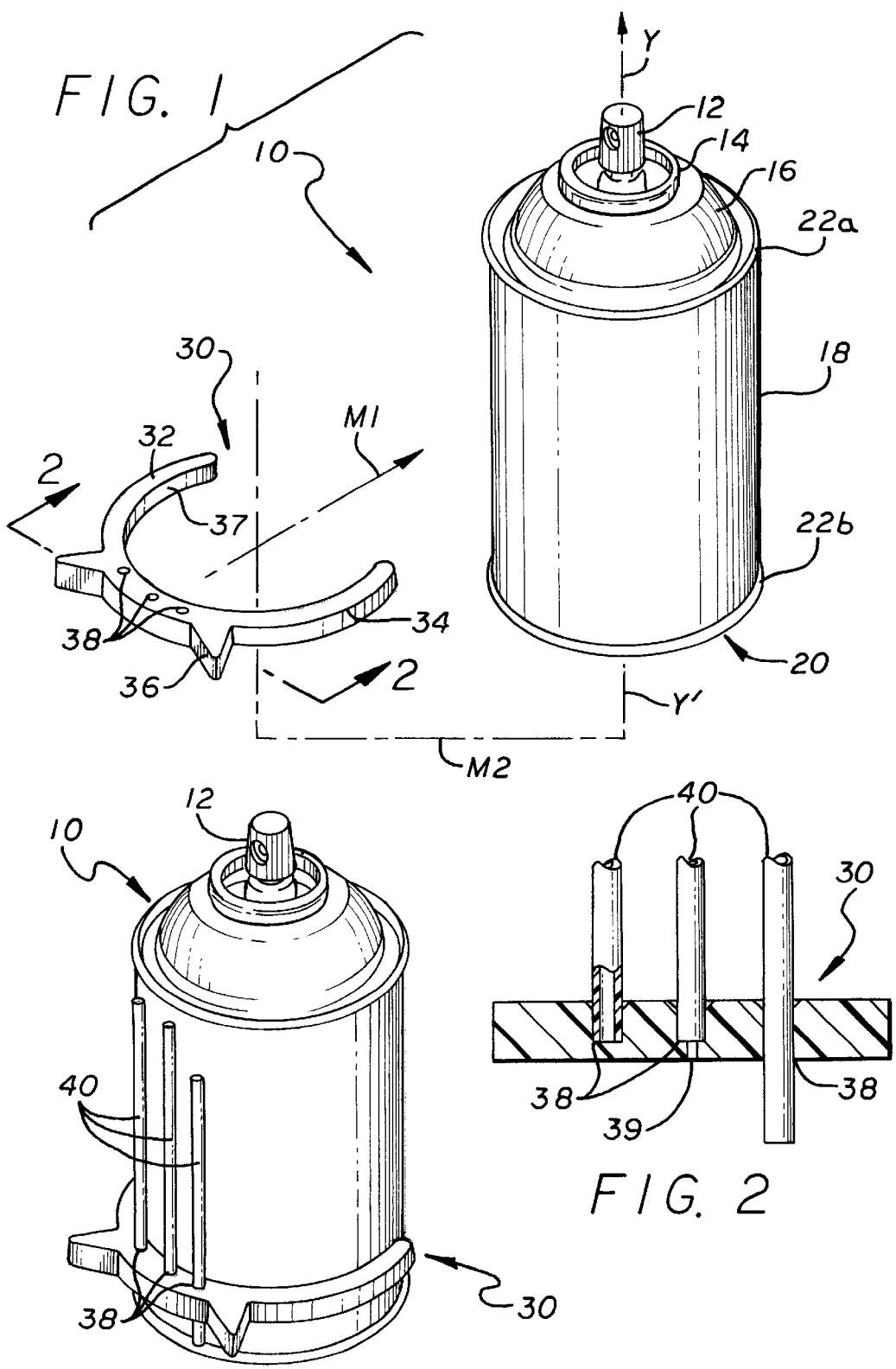

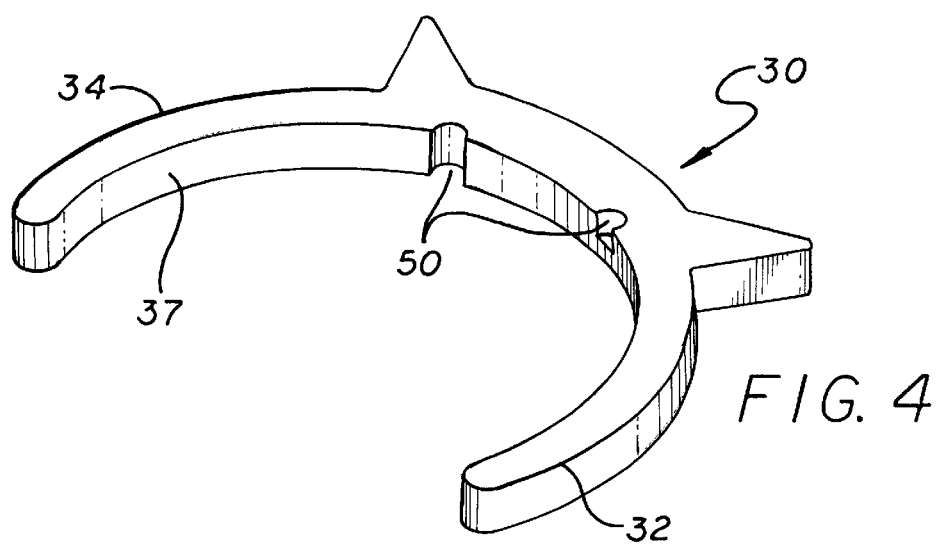
FIG. 4
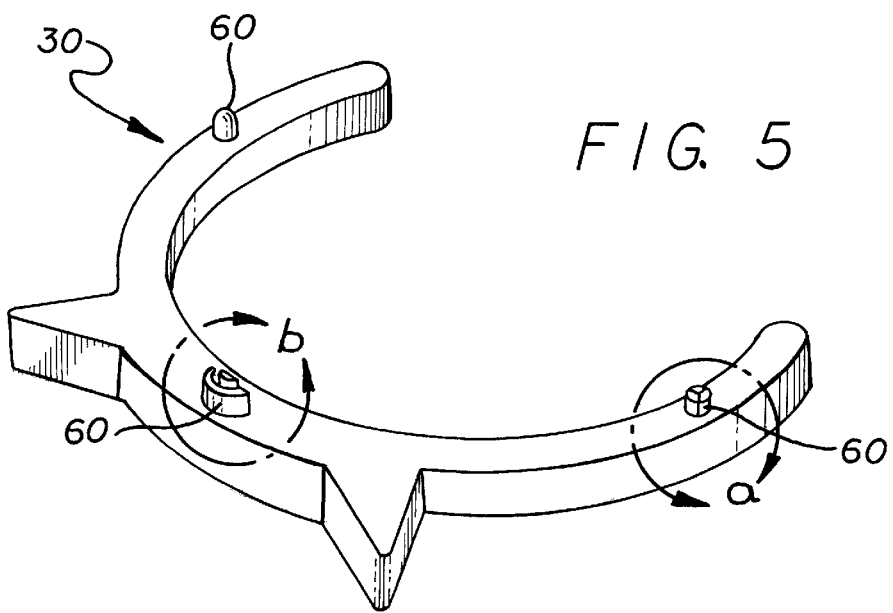
FIG. 5
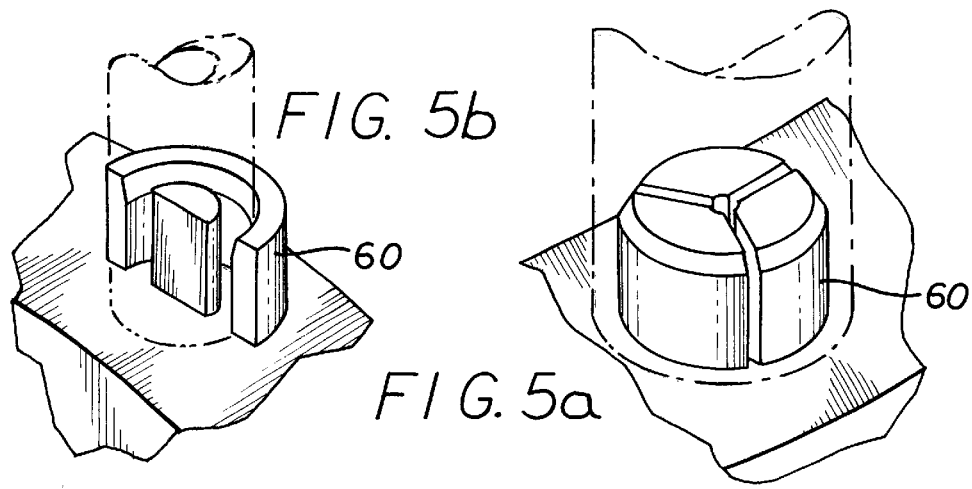
FIG. 5b
FIG. 5a

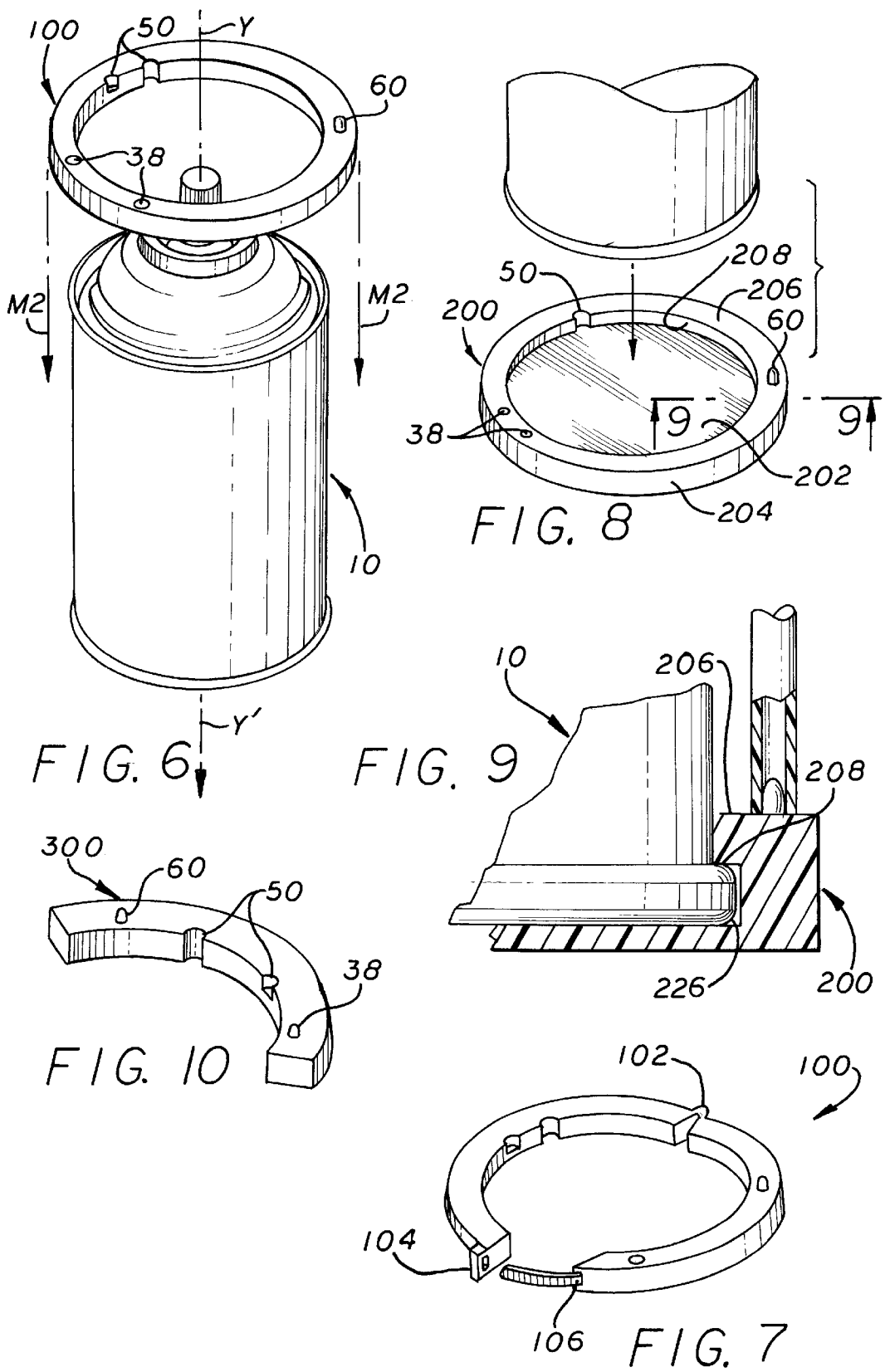

TUBE STORAGE DEVICE

BACKGROUND OF THE INVENTION

1. Field of the Invention

The invention relates generally to storage devices and more particularly to a storage device for extension tubes typically used in conjunction with aerosol spray cans.

2. Background Information

In 1953, Norm Larson and his co-workers at Rocket Chemical in San Diego, Calif., developed a rust-preventive solvent that displaced water. Five years later, in 1958, WD-40 aerosol was packaged in the familiar blue-and-yellow spray can by the WD-40 Company for use outside the aerospace industry. The WD-40 brand® is a petroleum-based, multi-purpose product that is used as a lubricant, rust preventative, penetrant, and moisture displacer. Its five basic properties—cleaning, lubricating, penetrating, displacing moisture and preventing rust—generates thousands of uses at work, in the home, for the car, at the workbench, in the garden and on sports and recreation equipment. For example, U.S. Pat. No. 4,257,464 discloses a fabric cover treated with a mixture of TRI-FLON® and WD-40® where the cover is used to protect hand guns, rifles and firearms from rust and corrosion. Many other uses for WD-40 brand are set out in Tim Nyberg & Jim Berg, The WD-40 Book (Bad Dog Press, March 1997).

The WD-40 brand is the most important product offered by The WD-40 Company, serving as the cornerstone for all the Company does. Four out of five US households have a can of WD-40® which is sold through retail outlets and industrial distributors in over 150 countries. The success of WD-40® has spawned literally hundreds of imitators, some backed by billion-dollar corporations. However, strong brand loyalty has enabled WD-40® not only to withstand incursions by competitors, but to actually expand its market share in the multi-purpose category.

To enhance the application of the atomized liquids propelled by the WD-40® spray can, the WD-40 Company includes a single, plastic, hollow extension tube with each can. By focusing the conic shaped spray of the atomized liquids into a narrow stream and transporting that stream to at least a fixed point at the end of the tube, the tube creates a penetrating jet stream that not only reaches confined spaces but acts to enhance the five basic properties of WD-40®. The tube is central to many of the uses for WD-40® set out above.

The red, polypropylene WD-40® extension tube that is used in conjunction with the WD-40® spray can is manufactured by Summit Packaging Systems, Inc. of Manchester, N.H. This flexible, but resilient hollow tube may come in a variety of shapes and sizes. For example, Summit Packaging Systems part number 38009 has an outside diameter of 0.085 inches, an inside diameter (or "lumen") of 0.040 inches and a length of 4 inches. Summit Packaging Systems part number 0115 has an outside diameter of 0.082 inches, a lumen of 0.035 inches and a length of 6 inches.

Like most manufacturers who supply an extension tube with their spray can, the WD-40 Company holds the tube to the WD-40® spray can through a single piece was of adhesive tape. This adhesive tape is comprised of adhesive film disposed upon a thin, clear, mylar layer, with the layer being approximately 1.25 inches in length and 0.75 inches in width. At the WD-40 Company factory, the tube is held in physical, vertical contact with the WD-40® can by adhering the tape to the can lengthwise along the can's circumferential exterior at approximately the vertical midpoint of the can's circumferential exterior so that the tube is interposed between the tape and the can's circumferential exterior. With the tube attached to the can by the adhesive tape, the can is then shipped to retailers and sold to consumers.

The adhesive tape holds the tube in direct contact with the WD-40® spray can through two mechanisms. The first mechanism is the adhesiveness of the tape itself, which adheres to the outer surface of the tube to hold the tube in place. The second mechanism relies on a wedging force initially formed in the gap between the mylar tape and the can.

In using the plastic tube, the light amber WD-40® solvent inevitably coats the outside surface of the tube. Upon replacing the plastic tube into its adhesive tape holster, the WD-40® solvent residing on the outside surface of the tube acts upon the tape's adhesive film, causing the film to loose its adhering properties where the tube meets the adhesive tape. In other words, the first mechanism of holding the tube to the can through the adhesiveness of the tape itself is quickly lost upon using the WD-40® product.

The wedging force is similarly lost through using the WD-40® product. In this case, the consumer's actions of repeatedly removing the tube from its tape holster and replacing the tube back into its tape holster inevitably widens the gap between the mylar tape and the can until the gap no longer offer no support for the tube. Among the problems with using mylar tape to secure an extension tube is that the tape is not rigid enough to withstand repeated insertions and removals of the tube.

With no mechanism left to store the tube in conjunction with can, the consumer is left to find an adequate storage location for not only the can, but the small, narrow tube itself. Since an adequate storage device for these tubes is not supplied with the WD-40® can, the tubes frequently become damaged or lost. The present solutions to this problem are to either use the WD-40® product without the tube or to replace the damage/lost tube with another tube. For example, the WD-40 Company will supply free tube replacements merely by phoning the corporate headquarters in San Diego, Calif. In either case, the consumer is left without the ability to use the tube for a period of time. It is the consumer's lack of ability to use the tube for a period of time that, in turn, upsets the enhancement of the five basic properties of WD-40® added through the use of the tube.

Other solutions have been put forth. For example, U.S. Pat. Nos. 5,544,783 and 5,558,247 relate to a spray can extension tube holder comprising a device that clips onto the spray can, the device having an exterior, C-shaped configuration, where the axial opening of this C-shaped configuration extends radially outward from the device. The axial opening of the C-shaped configuration permits the user to snap the extension tube through the exterior wall of the device. However, this axial opening does not secure the extension tube against an accidental force that is applied to the extension tube, particularly when that force is applied radially outward from the far end of the extension tube. Under such circumstances, the force leverages the extension tube against either the upper or lower portion of the opening of the C-shaped configuration and, using the wall of the device as a fulcrum, knocks the extension tube from the spray can extension tube holder.

As another example, U.S. Pat. No. 5,772,068 relates to a cylindrical aerosol extension spray tube holder permanently secured to a spray can. The holder has an axial bore extending longitudinally through at least a portion of the tube holder so that, as shown in the figures of U.S. Pat. No. 5,772,068, at least three quarters of the extension tube may be encased within the holder. By permanently securing the holder to a spray can, the holder may interfere with the user's grip on the can where the nozzle rotates into a position such as shown in FIG. 2 of U.S. Pat. No. 5,772,068. U.S. Pat. No. 5,772,084 also suffers from this same problem. Moreover, by encasing the majority of the extension tube within the holder, the user can not easily remove the extension tube nor quickly inspect the extension tube for wear.

Other art that might be relevant to this area includes U.S. Pat. Nos. 5,178,354, 5,143,263, 4,823,445, 4,819,838, and 4,305,528.

Thus, there is a need for a device that adequately stores the extension tube in conjunction with the can not only at the time of sale, but over time as the product contained in the can is consumed in use. The invention disclosed relates to a device that allows the consumer to store over time at least one extension tube in conjunction with its can. Although the problems with the storage device for the extension tube used with WD-40® can were the inspiration for the invention, the use of this invention is not limited to the WD-40® can, but extends to storing at least one tube to any packaging of fluid that makes use of an extension tube. The benefits of the tube storage device include providing a stable, secure platform attached to the can from which the tubes may be safely stored for display and selection.

SUMMARY OF THE INVENTION

The invention relates to a device for storing an extension tube with a spray can. With the can having an exterior surface and the exterior surface of the can having a cross-section, an embodiment of the invention comprises a sleeve having a cavity adapted to receive the tube. The sleeve is coupled to the can through two resilient wings on the sleeve where the interior surface formed by these wings has a cross-section that conforms to, and is smaller than the cross-section of the exterior surface of the spray can. Through a slot formed by the free ends of the wings, the can engages the interior surface of the wings by causing the slot to deform apart then return towards the original width of the slot as the can passes between the slot.

BRIEF DESCRIPTION OF THE DRAWINGS

FIG. 1 is a perspective view of the first embodiment of the device according to the invention.

FIG. 2 is a section view of FIG. 1 taken on line 2—2 of FIG. 1.

FIG. 3 is an elevation view of the first embodiment of tube storage device according to the invention.

FIG. 4 is a perspective view of the recessed portion of the second embodiment of the device according to the invention.

FIG. 5 is a perspective view of the peg of the third embodiment of the device 1, according to the invention.

FIG. 5a is detailed view of the peg of FIG. 5 taken within line a.

FIG. 5b is detailed view of the peg of FIG. 5 taken within line b.

FIG. 6 is a perspective view of the annular ring of the fourth embodiment of the device according to the invention.

FIG. 7 is a perspective view of the annular ring showing a hinge and locking mechanism.

FIG. 8 is a perspective view of the base of the fifth embodiment of the device according to the invention.

FIG. 9 is a section view of the base of FIG. 8 taken on line 9—9 of FIG. 8.

FIG. 10 is a perspective view of the body of the sixth embodiment of the device according to the invention.

DETAILED DESCRIPTION OF THE INVENTION

Plastic, hollow extension tubes are typically used to enhance the application of atomized liquids by focusing the conic shaped spray of the atomized liquids into a narrow stream and transporting that stream to at least a fixed point at the end of the tube. Since there is no adequate storage device for these tubes when the tubes are not in use, the tubes frequently become damaged or lost. The invention disclosed relates to a device that allows the consumer to store at least one tube in conjunction with its can. The benefits of the tube storage device include providing a stable, secure platform attached to the can from which at least one extension tube may be safely stored, displayed, and selected.

For purposes of explanation, specific embodiments are set forth to provide a thorough understanding of the present invention. However, it will be understood by one skilled in the art, from reading this disclosure, that the invention may be practiced without these details. Moreover, well-known elements, devices, process steps and the like are not set forth in detail in order to avoid obscuring the present invention.

Reference is now made to FIGS. 1 to 8 to illustrate several embodiments of the tube storage device. In one embodiment, a sleeve adapted to receive at least one tube may be mounted onto the packaging of the fluid. As shown in FIG. 1, can 10 packages fluid for sale to consumers in a spray can and comprises actuator 12 residing on mounting cap 14, where mounting cap 14 is crimped onto collar 16. Cylindrical housing 18 is sealed at the top by collar 16, forming chine or ridge 22a, and sealed at the bottom by bottom part 20, forming ridge 22b.

Also shown in FIG. 1 is sleeve 30. In a preferred embodiment, sleeve 30 comprises two side wings 32 and 34, bent or curved in the form of a bow, as well as geometric protrusion 36 projecting outwards from the sleeve. The arcuate side wings 32 and 34 serve to define an axial slot between their mutually confronting axial edges as well as define an interior surface. Geometric protrusion 36 aids in applying and removing sleeve 30 from can 10.

Opposite to geometric protrusion 36, an axial slot directed along Y–Y' of can 10 is formed in sleeve 30 right through sleeve 30. In other words, geometric protrusion 36 and the axial slot of sleeve 30 are disposed in front of each other along the diameter of can 10 onto which sleeve 30 will be mounted. In this embodiment, the distance between the mutually confronting axial edges of side wings 32 and 34 is smaller than the diameter of the corresponding can 10. Side wings 32 and 34 are elastically deformable until can 10 may extend through the axial slot.

Concurrently with defining an axial slot, side wings 32 and 34 of sleeve 30 define an interior surface, the cross-section of which nearly corresponds the exterior cross-section of can 10. Although other cross-sections are possible for the fluid package, for the purposes of this embodiment, can 10 has a cylindrical cross-section. Thus, side wings 32 and 34 of sleeve 30 define interior cylindrical surface 37 in this embodiment, the cross-section of which nearly corresponds in diameter to the exterior diameter of can 10. Other sleeve 30 interior surface shapes, such as a "U" shape, rectangular shape, "V" shape, etc., may be used and are a function of the exterior cross-section of the fluid package. Side wings 32 and 34 may also be shaped accordingly.

Sleeve 30 is shown in FIG. 1 with a surface into which at least one storage hole or cavity 38 is formed, either partially or completely through the vertical thickness of sleeve 30; As shown in FIG. 2, where cavity 38 is formed partially through the vertical thickness of sleeve 30, the remainder of the thickness of sleeve 30 may be kept in tact or have drainage hole 39 formed through this thickness. Preferably, the storage cavities are shaped to retain tube 40 within cavity 38, such as by tapering cavity 38, although such securing may be accomplished by an insert included in cavity 38 or scoring the interior surface of cavity 38.

Since side wings 32 and 34 are elastically deformable, sleeve 30 may be clipped onto can 10 radially through the axial slot until sleeve 30 reaches the desired storage position. This movement is shown by arrow M1 in FIG. 1. Moreover, since side wings 32 and 34 are elastically deformable, side wings 32 and 34 may spread apart sideways to elastically engage sleeve 30 onto can 10 axially by sliding sleeve 30 along the periphery of can 10 until sleeve 30 reaches the desired storage position. This movement is shown by arrow M2 in FIG. 1. By inserting tube 40 into cavity 38, and inserting can 10 into sleeve 30, sleeve 30 holds tube 40 to can 10 without directly contacting can 10. The desired storage position may be that shown in FIG. 3. As shown, the tubes are stored directly under the path of the spray stream from actuator 12. This storage position permits the user to hold onto can 10 without contacting tube 40 or any embodiment of the tube storage device.

In another embodiment, rather than forming a cavity in the vertical thickness of sleeve 30, at least one recessed portion 50 is formed axially along Y–Y' (of FIG. 1) in the interior peripheral surface of the arcuate side wings 32 and 34. As shown in FIG. 4, recessed portion 50 may exhibit in cross-section a concave shape of an arc of a circle in the manner of a rigid wedge. Where recessed portion 50 is formed axially along Y–Y' in interior cylindrical surface 37 of the arcuate side wings 32 and 34, recessed portion 50 holds tube 40 to can 10 in direct contact with can 10, either by itself or in conjunction with can 10, thereby restricting the tube from being knocked out of the tube's storage position by an accidentally applied, radial force. Recessed portion 50 need not extend through the vertical thickness of sleeve 30. The surface of recessed portion 50 may have at least two distinct diameters or be scored to increase the retention of tube 40.

In another embodiment, rather than forming cavity 38 as shown in FIG. 1 or recessed portion 50 as shown in FIG. 4, peg 60 is formed axially along Y–Y' (of FIG. 1) in surface of sleeve 30. As shown in FIG. 5, peg 60 may exhibit in cross-section a diameter, onto which the hollow portion or lumen of tube 40 may be inserted. Peg 60 may have two or more portions as shown in FIG. 5a. Peg 60 need not exhibit in cross-section a diameter, but any shape that serves to retain tube 40 through interaction with the lumen of tube 40. Such shapes include, but are not limited to, needle shaped, bent, diamond shaped, nipple-shaped, cigar-shaped, and square. Peg 60 may also be bifurcated as shown in FIG. 5b for clamping to the side wall of tube 40.

In another embodiment, rather than coupling tube 40 to can 10 through sleeve 30, ring 100 having an annulus shape and adapted to receive at least one tube 40 may be mounted onto can 10. As shown in FIG. 6, ring 100 forms a complete annulus that may be inserted onto can 10 axially by disposing ring 100 along the periphery of can 10 until ring 100 reaches the desired storage position. This movement is shown by arrow M2 in FIG. 6. To store the at least one tube 40, ring 100 may have cavity 38, as discussed in connection with FIGS. 1, 2, and 3, recessed portion 50, as discussed in connection with FIG. 4, or peg 60, as discussed in connection with FIGS. 5, 5a, and 5b. Although cavity 38, recessed portion 50, and peg 60 are illustrated in FIG. 6, only one of these is needed to retain the at least one tube 40. In the preferred embodiment, ring 100 is a single piece construction. The single piece construction may be made of a resilient material, such as rubber, whose properties couples ring 100 to can 10 and are rigid enough to retain tube 40 in a fixed storage position. As shown in FIG. 7, ring 100 may also have hinge 102 that permits first end 104 to move in relation to second end 106 to form an opening in ring 100 as well as move in relation to second end 106 to engage second end 106 in a locked position.

In another embodiment, rather than coupling tube 40 to can 10 through sleeve 30 or ring 100, base 200 is adapted to be coupled to the bottom of can 10. As shown in FIG. 8, base 200 comprises a flat portion 202 and a side wall 204 extending upwardly therefrom and terminating at annular rim 206. Flat portion 202 restricts base 200 to the bottom of can 10 and may also serve to insulate can 10.

FIG. 9 is a section view of base 200 taken on line 9—9 of FIG. 8. As shown in FIG. 9, the annular rim 206 extends radially inward to form lip 208 capable of coupling base 200 to can 10 at ridge 22b through an overlapping rim-ridge technique. Annular rim 206 may be divided into two or more portions. Where can 10 lacks ridge 22b, base 200 may be adapted to be coupled to bottom part 20 of can 10 by other techniques. For example, annular rim 206 may be made of a resilient material that forms a compressive seal between base 200 and can 10 upon inserting can 10 into annular rim 206.

To store the at least one tube 40, base 200 may have cavity 38, as discussed in connection with FIGS. 1, 2, and 3, recessed portion 50, as discussed in connection with FIG. 4, or peg 60, as discussed in connection with FIGS. 5, 5a, and 5b formed into either sidewall 204 or annular rim 206. Although cavity 38, recessed portion 50, and peg 60 are illustrated in FIG. 8, only one of these is necessary to retain the at least one tube 40. By inserting tube 40 into base 200 and inserting can 10 into base 200, base 200 holds tube 40 to can 10 in a position such as that shown in FIG. 8.

In another embodiment, rather than coupling tube 40 to can 10 through sleeve 30, ring 100, or base 200, body 300 is made of magnetic material and engages can 10 by magnetically adhering to can 10. As shown in FIG. 10, body 300 may include cavity 38, as discussed in connection with FIGS. 1, 2, and 3, recessed portion 50, as discussed in connection with FIG. 4, or peg 60, as discussed in connection with FIGS. 5, 5a, and 5b. Although cavity 38, recessed portion 50, and peg 60 are illustrated in FIG. 10, only one of these is necessary to retain the at least one tube 40. By inserting tube 40 into body 300 and engaging can 10 to body 300, body 300 holds tube 40 to can 10.

The embodiments of the invention described in relations to FIGS. 1, 4, 5, and 7 above is made preferably from a single molding in which ABS plastic material was injected into the mold. Taking into account the structure and the function of the particular embodiment, materials such as glass, metal, wood, paper, cork, ceramic, cordage, fabric, stone or other material may be used for the embodiments of the invention to form a similar shape using appropriate methods.

While the present invention has been particularly described with reference to the various figures, it should be understood that the figures are for illustration only and should not be taken as limiting the scope of the invention. Many changes and modifications may be made to the invention, by one having ordinary skill in the art, without departing from the spirit and scope of the invention.

What is claimed is:

1. A device for storing at least one tube with a spray can, the can having an exterior surface, the exterior surface of the can having a cross-section, the device comprising:

a sleeve, the sleeve having a surface with material removed to define at least one cavity, the cavity adapted to receive the at least one tube, the sleeve further having a thickness, wherein the cavity extends through a first portion of the thickness and does not extend through a second portion of the thickness, where the second portion of the thickness has material removed to define a drainage hole extending through said second portion, the drainage hole having a diameter that restricts the tube from extending there through, and the sleeve further having at least one triangular protrusion projecting radially outwards from the sleeve, the protrusion adapted to aid in applying and removing the sleeve from the can, and resilient wings having opposing inner faces, the opposing inner faces defining an interior surface having a cross-section that conforms to, and is smaller than the cross-section of the exterior surface of the can, each resilient wing further having a free end wherein the free ends define a slot there between, wherein the slot has a width, the width being smaller than the exterior cross-section of the can such that engaging the can against the free ends of the wings causes the wings to deform apart, thereby enlarging the slot to permit the can to pass there between and engage the interior surface of the wings as the slot width returns towards the original width of the slot.

2. The device of claim 1 wherein the interior surface of the wings is circular.

3. The device of claim 2, the cavity further comprising:

a means for retaining the tube within the cavity.

4. The device of claim 3, wherein the means for retaining the tube within the cavity is accomplished by an insert placed into the cavity.

* * * * *